329// United States Patent Office 3,047,341
Patented July 31, 1962

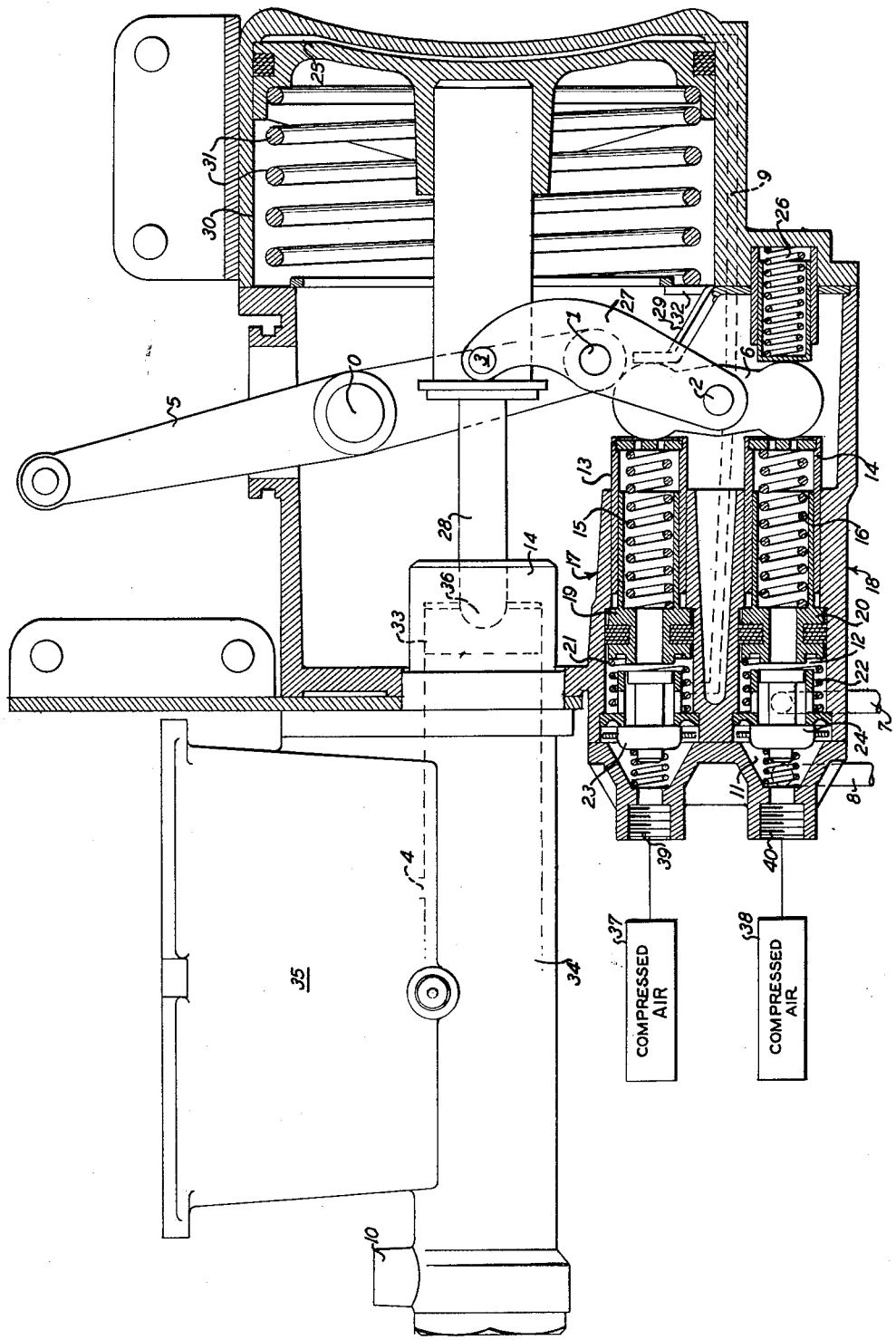

3,047,341
SERVOBRAKE WITH DUPLEX DISTRIBUTOR FOR BRAKING EQUIPMENT OF THE HYDROPNEUMATIC KIND
Giuseppe Alfieri, Milan, Italy, assignor to Fabbrica Italiani Magneti Marelli S.p.A., Milan, Italy, a company of Italy
Filed Mar. 24, 1958, Ser. No. 723,580
Claims priority, application Italy Mar. 23, 1957
3 Claims. (Cl. 303—53)

The present invention relates to the application of servobrakes with pneumatic duplex distributors in braking equipment of the hydropneumatic type.

The new servobrake according to the invention is essentially constituted by a pneumatic operator member, by a hydraulic pump with an associated tank, by transmissions and mechanical transmission and control members and by two pneumatic distributors. It is an object of the invention to provide an improved system to cause the braking of a trailer prior to the braking of the associated tractor.

According to one feature of the present invention, the two pneumatic distributors are independent of each other, which enables obtaining desirable safety and functional characteristics.

The invention contemplates providing a duplex circuit by coupling to a servobrake two pneumatic distributors in lieu of one, which distributors may be arranged, according to a further feature of the invention, either vertically or horizontally, without modifying the general arrangement of the apparatus so as to maintain its compactness and simplicity.

In accordance with the invention, it is possible to employ the lever systems of conventional servobrakes with the possibility of direct action upon the hydraulic pump while attaining all the advantages of duplex installations (safety, precision of braking and so on).

The invention will be illustrated with reference to the accompanying drawing which shows a preferred embodiment of the invention.

The sole FIGURE of the drawing is a sectional view of a device of the invention wherein the two distributors are arranged vertically.

In the drawing, brake lever 5 is pivoted at O and connected at 1 to a lever 27 for actuating the distributors; the lever 27 is pivoted at 2 to the rod 6 and is connected at 3 to the rod 28 of the piston 25. The rod 6 engages at its ends cups 13 and 14 respectively in contact with the springs 15 and 16 which in turn are engaged at the bottom of the slidable elements 19 and 20 arranged in the interior of the two distributors 17 and 18. A stop 29 limits through the spring 15 and the element 13, movement towards the right of 19; whereas for 20, movement is limited by interposing between the element 14 and the stationary casing, the spring 26 which adjusts the movement of 20 with respect to 19. The ends of 19 and 20 act through the springs 21 and 22 respectively upon inlet valves 23 and 24 to open the same. Valve 24 divides the associated chamber into sections 11 and 12. The piston 25 is slidable in the cylindrical chamber 30 and is restrained in its movement towards the left by the spring 31 which rests on the projections 32 arranged in the interior of cylinder 30. The end 36 of the stem 28 opposite to the end at which said stem is attached to the piston 25, controls the small plunger 33 of the hydraulic pump 34 fed via the conduit 4 with oil contained in the tank 35; the oil under pressure in the pump or source 34 acts through the conduit 10 upon an associated brake (not shown).

Operation of the device is as follows: When the brake is actuated, the lever 5 rotates clockwise around O thereby displacing the lever 27 towards the left. Lever 27 tends to displace the rod 6 pivoted at 2 and the pivot 3 connected to the stem 28 along with it in its movement; said pivot 3 initially effects a very short stroke; in fact in the initial stage, when the oil in tank 34 is first subjected to pressure and movement of plunger 33 is resisted, the pivot 3 can only advance a little. The action of the lever 5 is exerted essentially upon the end 2 of the lever. The rod 6 continues movement towards the left and carries along the cups 14 and 13 to compress the springs 16 and 15. After a period of time which is a function of the characteristics of the springs, rod 6 determines the displacement of elements 20 and 19 in the same direction with a consequent compression of the load springs 22 and 21 and the subsequent opening of the valves 24 and 23.

The opening of the valve 24 precedes that of 23. This is attained by employing the spring 26 which acts upon 14 thereby causing the displacement thereof in advance with respect to 13. The opening of 24 permits the inflow of compressed air from a tank 38 via fitting 40 into a conduit 7 of the vehicle which conduit is connected to chamber section 12.

Through a conduit 8 connected to chamber section 11, the supply to the reservoir of the trailer braking section (not shown) is permanently insured. After a slight delay with respect to the operation of valve 24, the valve 23 opens and the compressed fluid coming from tank 37 (connected by fitting 39) arrives through conduit 9 and passes to the chamber 30 thereby causing further displacement towards the left of the piston 25 and of the plunger 33 rigid therewith; the oil in pump 34 is thereby put under pressure and, through the conduit 10, it acts upon the brakes. In the release stage (that is, when the action upon the brake pedal ceases) the piston 25 is pushed towards the right by the spring 31. During this stroke, the rod 27 and the rod 6 are carried along.

The elements 13 and 14 move with rod 6 and consequently their action upon 19 and 20 ceases. Hence, the valve 23 closes and the fluid discharges from 30 by flowing through the conduit 9 and the distributor 17 into the atmosphere through a special hole provided in the case. The operation is analogous with respect to distributor 18.

It should be noted that movement is imparted to 18 by spring 26, while for 17 the stroke is limited by the stop 29. This causes, with appropriate connections (not shown), a braking of the trailer in advance to braking of the associated truck.

Reference has been made to one embodiment of the invention; it is evident, however, that the invention is not limited to this embodiment which is susceptible of many variations and modifications within the scope of the invention.

What is claimed is:

1. Brake control apparatus adapted for operative connection to first and second braking sections and for initiating the operation of the first section in advance of the second section, said apparatus comprising a source of pressure fluid adapted for connection to said second section, a plunger in said source to urge said fluid towards said second section, a chamber, a piston in said chamber, a rod connecting said piston to said plunger to control movement of the plunger in said source whereby the connection of the fluid to said second section is controlled, first and second distributors, a source of pressure fluid connected to said distributors, elements in the distributors to open the same for the discharge of pressure fluid supplied thereto, means connecting the first distributor to said first braking section for supplying pressure fluid to the same, means defining a passageway between said second distributor and said chamber for the discharge of pressure fluid supplied to said second distributor for actuating said piston, a lever system coupled to said elements for displacing the same thereby to cause discharge of the fluid supplied to the distributors, and means including a spring operatively associated with said lever system to supplement the action of the same on the element in said first distributor whereby the latter discharges in advance of the second distributor, discharge of the second distributor acting through said piston to move said plunger to discharge pressure fluid to said second section whereby the operation of the said second section is initiated after the first section.

2. Apparatus as claimed in claim 1, wherein said lever system is pivotally connected to said rod, comprising means in said chamber resisting movement of said piston.

3. Apparatus as claimed in claim 2, wherein said lever system comprises a rod pivotally connected to said elements, a further rod pivotally connected between the first said rods, a lever pivotally connected to said further rod, and a fixed pivot supporting said lever.

References Cited in the file of this patent

UNITED STATES PATENTS

| | | |
|---|---|---|
| 2,515,946 | Cadman | July 18, 1950 |
| 2,653,680 | Allin et al. | Sept. 29, 1953 |
| 2,680,654 | Hedge et al. | June 8, 1954 |
| 2,694,468 | Price | Nov. 16, 1954 |
| 2,746,255 | Fitch et al. | May 22, 1956 |
| 2,934,041 | Ayers | Apr. 26, 1960 |
| 2,934,042 | Stelzer | Apr. 26, 1960 |

FOREIGN PATENTS

| | | |
|---|---|---|
| 765,095 | Germany | Feb. 8, 1954 |
| 216,858 | Switzerland | Jan. 5, 1942 |